(12) United States Patent
Linde

(10) Patent No.: US 9,038,814 B2
(45) Date of Patent: May 26, 2015

(54) GRAIN SAVER CATCH FOR AN AGRICULTURAL COMBINE

(71) Applicant: CNH America LLC, New Holland, PA (US)

(72) Inventor: Cooper Wilhelm Linde, Lancaster, PA (US)

(73) Assignee: CNH Industrial America LLC, New Holland, PA (US)

( * ) Notice: Subject to any disclaimer, the term of this patent is extended or adjusted under 35 U.S.C. 154(b) by 257 days.

(21) Appl. No.: 13/671,950

(22) Filed: Nov. 8, 2012

(65) Prior Publication Data

US 2014/0128134 A1    May 8, 2014

(51) Int. Cl.
| | |
|---|---|
| *B60P 1/40* | (2006.01) |
| *A01F 12/46* | (2006.01) |
| *A01D 41/12* | (2006.01) |
| *B65G 33/08* | (2006.01) |

(52) U.S. Cl.
CPC ............ *A01D 41/1217* (2013.01); *B65G 33/08* (2013.01)

(58) Field of Classification Search
USPC ........... 198/534–536, 548, 550.2, 550.4, 671, 198/531; 193/12, 22, 23, 25 A, 30; 56/16.6; 460/114
See application file for complete search history.

(56) References Cited

U.S. PATENT DOCUMENTS

| | | | |
|---|---|---|---|
| 4,401,242 A | 8/1983 | Bonomo | |
| 4,540,086 A * | 9/1985 | David et al. | ................... 198/536 |
| 6,691,861 B2 | 2/2004 | Reimer et al. | |
| 7,527,555 B2 | 5/2009 | Grotelueschen | |
| 7,584,836 B2 | 9/2009 | McCully et al. | |
| 7,644,816 B2 | 1/2010 | Veiga Leal et al. | |
| 7,938,613 B2 | 5/2011 | Yoder et al. | |
| 2011/0029205 A1 | 2/2011 | Ricketts et al. | |

* cited by examiner

*Primary Examiner* — Robert Pezzuto
(74) *Attorney, Agent, or Firm* — Patrick M. Sheldrake; Seyed V. Sharifi T.

(57) ABSTRACT

An agricultural combine unloader assembly includes an unloader tube having an internal passage in fluid communication with a discharge outlet at an end of the unloader tube. A door is mounted adjacent the discharge outlet for covering the discharge outlet. The door is moveable between an open position uncovering the discharge outlet and a closed position at least partially covering the discharge outlet. In the open position, the door is positioned below a flow path of grain to be discharged through the discharge outlet. A catch is mounted adjacent the door. The catch includes a housing having an open end adjacent a first end of the door and a closed end adjacent a second end of the door opposite the first end. The catch is operatively connected to the door and movable between a first position and a second position.

26 Claims, 7 Drawing Sheets

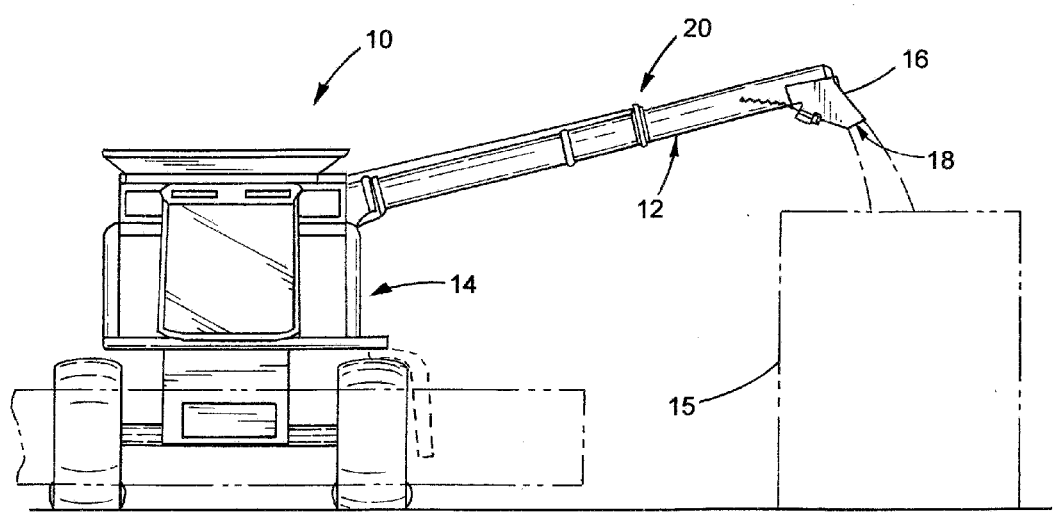
FIG.1
PRIOR ART
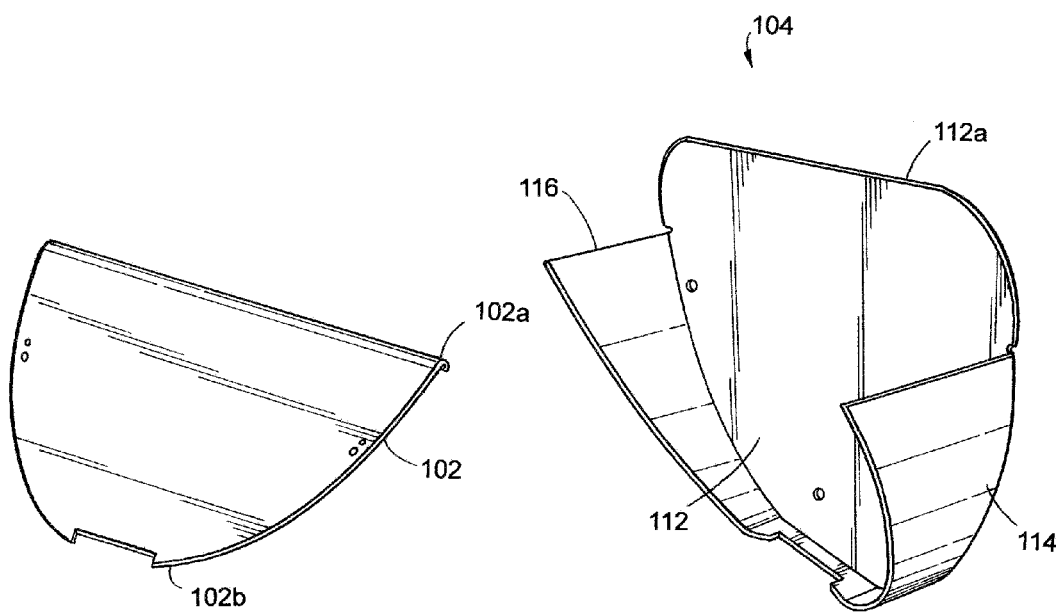
FIG.2A
FIG.2B

GRAIN SAVER CATCH FOR AN AGRICULTURAL COMBINE

BACKGROUND OF THE INVENTION

The present invention generally relates to agricultural combines and more particularly to a grain saver catch for a discharge opening of a grain unloader on the combine.

In an agricultural harvester combine, during the unload cycle an unloader conveyer is operated to move grain from a grain tank of the combine to another tank or receptacle, such as on a truck or wagon through an unloading tube. In conventional agricultural combines, an unloading tube has a discharge outlet in communication with a discharge spout and an associated dribble door biased toward a closed position at least partially covering the discharge outlet. During operation of the unloader conveyer, if sufficient grain is present, the grain will flow out and push against the dribble door to push the door open and flow out to discharge the grain into the truck or wagon.

However, a problem associated with conventional unloader conveyers on agricultural combines occurs during the discharge process as some of the grain traversing the unloader conveyer is lost due to accidental discharge at inappropriate times and falls outside of the intended discharge destination. This problem occurs as a result of the dribble door on the unloader tube not closing fully, grain particles biasing the dribble door ajar, or grain escaping from the dribble door as a result of vibration from the moving combine. Over time and over large harvest areas, the associated lost grain can result in substantial grain loss and therefore, economic loss.

Thus, there is a need for a system and apparatus of an agricultural combine unloader assembly that addresses the aforementioned deficiencies of conventional combines. Such needs are met by the agricultural combine unloader assembly of the present invention.

BRIEF SUMMARY OF THE INVENTION

According to a preferred embodiment of the present invention, an agricultural combine unloader assembly is disclosed. The unloader assembly includes an unloader tube having an internal passage in fluid communication with a discharge outlet at an end of the unloader tube. A door is mounted adjacent the discharge outlet for covering the discharge outlet. The door is moveable between an open position uncovering the discharge outlet and a closed position at least partially covering the discharge outlet. In the open position, the door is positioned below a flow path of grain to be discharged through the discharge outlet. The unloader assembly further includes a catch mounted adjacent the door. The catch includes a housing having an open end adjacent a first end of the door and a closed end adjacent a second end of the door opposite the first end. The catch is operatively connected to the door and movable between a first position and a second position.

In accordance with another preferred embodiment of the present invention a door assembly for an agricultural combine unloader is disclosed. The door assembly includes a door sized and shaped for covering a discharge outlet of an unloader tube. The door is mounted to the unloader tube and moves between a first position for at least partially covering the discharge outlet and a second position spaced from the first position. The door assembly further includes a catch operatively connected to the door for receiving grain from the discharge outlet.

In accordance with a further preferred embodiment of the present invention, an agricultural combine unloader assembly is disclosed. The unloader assembly includes an unloader tube having an internal passage in fluid communication with a discharge outlet at an end of the unloader tube. The unloader assembly further includes a catch mounted adjacent the discharge outlet. The catch includes a receptacle having an open end and a closed end opposite the open end. The catch is moveable between a first position for at least partially covering the discharge outlet and a second position located below a flow path of grain discharged through the discharge outlet for releasing grain retained within the catch.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIG. 1 illustrates a rear elevation view of a conventional agricultural harvester combine machine with an unloader assembly for discharging grain into a container;

FIG. 2A illustrates a perspective view of a dribble door in accordance with a preferred embodiment of the present invention;

FIG. 2B illustrates a perspective view of the grain saver catch of FIG. 2;

DETAILED DESCRIPTION OF THE INVENTION

Figure 2:
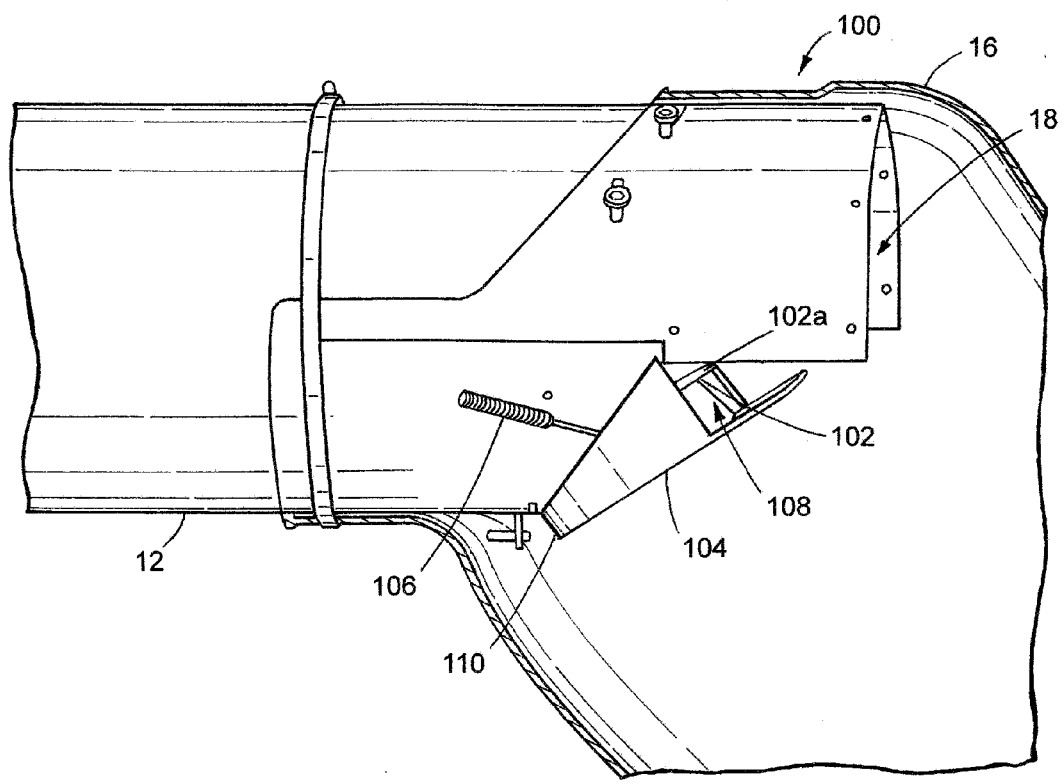
FIG. 2 illustrates an enlarged, partial, perspective view of an unloader tube having a grain saver catch in accordance with a preferred embodiment of the present invention with a spout shown in cross-section.

Reference will now be made in detail to the preferred embodiments of the present invention illustrated in the accompanying drawings. Wherever possible, the same or like reference numbers will be used throughout the drawings to refer to the same or the like features. It should be noted that the drawings are in simplified form and are not drawn to precise scale. In reference to the disclosure herein, for proposes of convenience and clarity only, directional terms such as top, bottom, above, below, and diagonal, are used with respect to the accompanying drawings. Such directional terms used in conjunction with the following description of the drawings should not be construed to limit the scope of the invention in any manner not explicitly set forth. Additionally, the term "a," as used in the specification, means "at least one." The terminology includes the words above specifically mentioned, derivatives thereof, and words of similar import.

The terms "grain," "tailing," and "crop material" are used throughout the specification for convenience and it should be understood that these terms are not intended to be limiting. Thus, "grain" refers to that part of a crop which is harvested and separated from discardable portions of crop material.

Referring now to FIG. 1, a representative agricultural harvesting combine 10, which is a combine harvester of known construction and operation, is shown, including an unloader assembly 20 constructed and operable according to the teachings of the present invention. In FIG. 1, a cylindrical shaped unloader tube 12 and a spout 16 connected to an end of the unloader tube 12 are shown in a sidewardly and upwardly extending deployed or unloading position, for unloading grain into an accompanying container 15, which here is illustrated by a conventional agricultural grain wagon 15. This is intended to be representative of a wide variety of unloading operations, illustrating the flow of grain from the combine 10 being directed to a receiving container, such as wagon 15, periodically during operation of the combine 10. When not in use, unloader tube 12 can be stored in a position extending rearwardly (not shown) from the combine 10.

Referring to FIG. 2, in accordance with a first preferred embodiment, the present invention provides an unloader assembly 100 for the agricultural combine 10. The unloader assembly 100 includes an unloader tube 12, a door 102 mounted adjacent a discharge outlet or opening 18 of the unloader tube, and a catch 104 mounted adjacent the door 102. The features of the door 102 and catch 104 are also referred to herein as a door assembly. Unloader tube 12 includes an internal passage containing a conveyer e.g., a helical auger (not shown) rotatable for conveying grain through the internal passage of the tube 12 and discharging the grain through the discharge outlet 18 and down discharge spout 16 along a flow path (represented by arrows A in FIG. 3).

Figure 3:
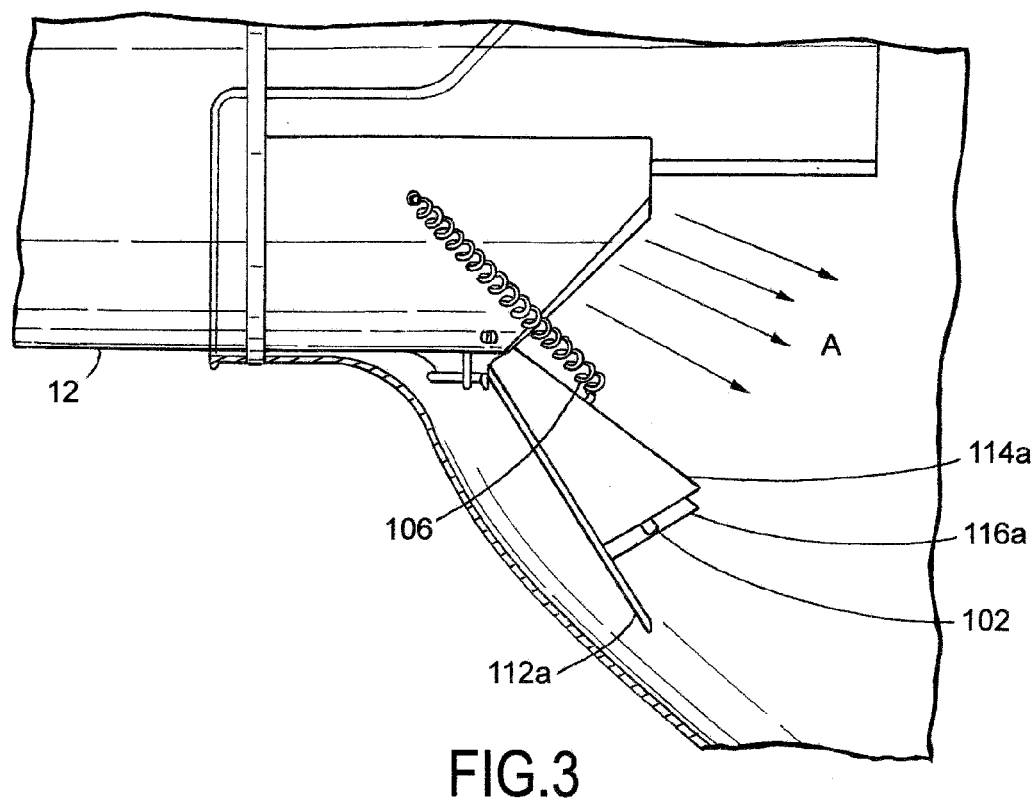
FIG. 3 illustrates an enlarged, partial, perspective view of the grain saver catch of FIG. 2 in a second or discharge position.

The door 102 is a grain saver door pivotally mounted in connection with the unloader tube 12 adjacent to discharge outlet 18, as can be seen in FIGS. 2 and 3. The door 102 is supported for pivotal movement along a path between a closed position (FIG. 2) in covering relation to at least a portion of discharge outlet 18 through a range of partially open positions (FIG. 3 illustrates an open position of the door 102). In other words, the door 102 is pivotally connected to the unloader tube 12 preferably about a lower region of the unloader tube 12. In the open position, the door 102 is positioned spaced from the discharge outlet 18 so as to uncover the discharge outlet 18 and remain below the flow path of grain being discharged from the discharge outlet 18.

A biasing element 106, preferably configured as a compression spring, is disposed and configured in connection with door 102 and the unloader tube 12, urging the door 102 toward the closed position. Biasing element 106 is further configured to be yieldable to a force exerted thereagainst by door 102 as a result of the rotation of the auger forcing the discharging grain against door 102 to allow door 102 to be movable by the force of the traveling grain, from the closed position through the range of partially open positions to the fully open position. Preferably, the biasing element 106 has one end connected to the unloader tube 12 and an opposite end connected to the door 102 (or catch 104 which is connected to the door 102). Thus, when the door 102 is in the closed position the compression spring 106 is in a first compressed or elongated state and when the door 102 is in the open position the compression spring 106 is in a second compressed or elongated state.

The door 102 can be any door of any size or configuration capable of at least partially covering the discharge outlet 18, or alternatively completely covering the discharge outlet 18 to prevent the discharge of grain therefrom when in the closed position. Preferably, the door 102 is configured as shown in FIG. 2A having a profile congruent with the discharge outlet 18 profile. Further, the door 102 can be configured as a substantially planar door, an arch-shaped door, a curved door, a door with a flange extension extending beyond the discharge outlet 18, a screen door and the like. Other exemplary grain dribble doors and their mechanisms for attachment to an unloader tube applicable to the present invention are disclosed in U.S. Pat. Nos. 7,584,836; 6,691,861; and 7,527,555, and U.S. Patent Application Publication No. 2011/0029205, the entire disclosures of which are hereby incorporated by reference in their entirety.

Figure 4:
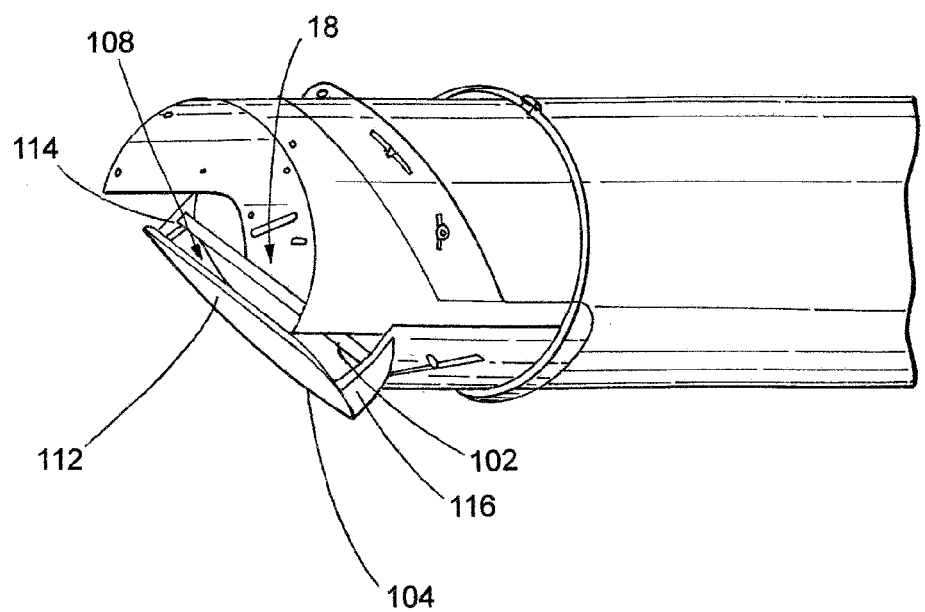
FIG. 4 illustrates another enlarged, partial, perspective view of the unloader tube and grain saver catch of FIG. 2.
Figure 4A:
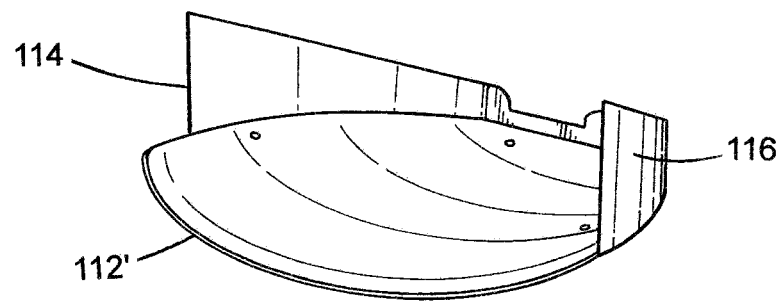
FIG. 4A illustrates a perspective view of a grain saver catch in accordance with another preferred embodiment of the present invention.

Referring to FIGS. 2, 2A, 2B and 4, the catch 104 includes a housing or receptacle having an open end 108 adjacent a first end 102a of the door 102 and a closed end 110 adjacent a second end 102b of the door 102 which is opposite the first end 102a. Preferably, the catch 104 is configured as best shown in FIG. 2B. The catch 104 is connected to the door 102 and moveable between a first position (FIG. 2) and a second position (FIG. 3), in tandem with the door 102. The housing is also configured with side walls forming an enclosure, with the door 102 forming one of the side walls of the housing. As shown in FIG. 4, the housing enclosure includes four side walls with the door 102 forming a side wall substantially facing the discharge outlet 18. In other words, the catch housing or receptacle is partially formed by the door 102 i.e., it includes at least one wall forming an enclosure in cooperation with the door for receiving grain. Alternatively, the catch 104 can be configured to have a curved side wall 112' in combination with the door 102, as shown in FIG. 4A, or any other configuration capable of forming the housing portion of the catch.

The catch housing is preferably configured as best shown in FIGS. 2-4 and includes a first wall 112 that is connected to lateral walls 114 and 116 (i.e., second and third walls), which can be substantially planar or contoured to match the profile of the discharge outlet 18. The lateral walls 114 and 116 are connected to the first wall 112 and further engaged or connected to the door 102, thereby forming an enclosure for the catch 104 but with an open top. The first wall 112 and lateral walls 114 and 116 are also preferably configured to extend beyond the door 102, as best shown in FIG. 2. That is, the lateral walls 114, 116 extend from the first wall 112 towards the door 102 and beyond. In other words, the extension portions of the lateral walls 114, 116 extend beyond an intersection point with door 102 (or a lateral wall and door interface) forming flange-like extensions 114a, 116a that can deflect the flow of grain from the discharge outlet 18 to the catch's open end 108 when the door is partially ajar. Similarly, the first wall 112 extends further from the top most aspect of the door 102 forming a flange-like extension portion or baffle 112a to direct the flow of grain escaping from the discharge outlet 18 to the catch's open end 108.

In sum, the catch housing includes a wall forming the open end 108 and an extension 112a extending from a portion of the wall. The extension 112a extends substantially parallel to the door 102 and beyond the first end 102a of the door 102, but can alternatively extend so as to be angled relative to a longitudinal axis of the door 102. The extension 112a can be a flange, a baffle, a concave extension, a convex extension, or a screen. Further, the catch 104 includes walls cooperatively engaging the door 102 forming a container having the open end 108 and the closed end 110.

Further, in a preferred aspect, the lateral walls 114 and 116 are configured such that a longitudinal cross-section of the open end 108 of the catch housing is larger than a longitudinal cross-section of the closed end 110. In other words, the catch housing is substantially configured as a U-shaped housing.

Referring again to FIG. 2, the closed end 110 of the catch 104 is the end of the catch 104 that is pivotally connected to the unloader tube 12 via a pivot mechanism. The closed end 110 is also positioned adjacent the second end 102b of the door 104 that is also pivotally connected to the unloader tube 12. The open end 108 of the catch 104 is adjacent the first end 102a of the door 102, which is opposite the second end 102b of the door 102.

Figure 5:
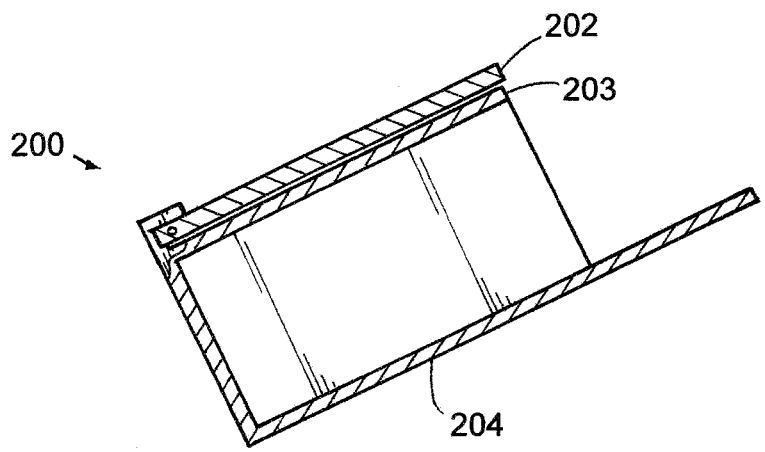
FIG. 5 illustrates a side cross-sectional view of a door and grain saver catch in accordance with yet another preferred embodiment of the present invention.

Referring to FIG. 5, in accordance with a second preferred embodiment, the present invention provides an unloader assembly 200 having a door 202 and a catch 204 that is separate from the door 202. That is, the catch 204 has a housing formed completely separate from door 202, which forms no part of the catch 204 housing. The catch 204 can be configured with four side walls similar to that of catch 104. In this embodiment, the catch 204 has an inner facing side wall 203 that complements the shape of the door 202 so as to allow the catch 204 to lay flat against the door 202 without any significant spacing therebetween. The remaining side walls of the catch 204 can be arranged in any number of ways, such as with three side walls or a single curved wall or as discussed above for catch 104, including flange-like or baffle extensions. The door 202 is configured substantially the same as door 102 except that it is not longer connected to the catch 204 forming a side wall portion thereof. Accordingly, the catch housing is moveable between first and second positions relative to the door 202. Further, the door 202 is pivotally connected to the unloader tube 12 (similar to the door 102 in the first embodiment) and the catch 204 is pivotally connected to the unloader tube 12 or pivotally connected to the door 202.

In sum, in each of the above embodiments, when the door 102, 202 is moved to the closed position, the catch 104, 204 is moved to the first position. When the door 102, 202 is moved to the open position, the catch 104, 204 is moved to the second position.

Referring back to the first embodiment of FIGS. 2 and 3, in operation, harvested grain is processed through the unloader tube 12. In the unloader tube 12, an auger conveys the grain to be discharged out through the discharge outlet 18. Owing to the force of traveling grain via rotation of the auger, the pressure from the grain forces open the door 102 to move the door 102 from the closed position to the open position. However, when grain is not actively being discharged through the unloader tube 12, grain still remains within the unloader tube 12 with the door 102 in the closed position. As a result, the grain within the unloader tube 12 can inadvertently escape when the combine continues its harvesting operations. That is, grain can inadvertently escape from above the door's top edge or hold the door ajar and escape from about the side edges of the door 102. However, owing to the catch 104 adjacent the door 102, escaping grain is now collected and retained with the catch 104 until it is time to unload into an appropriate container.

Figure 6:
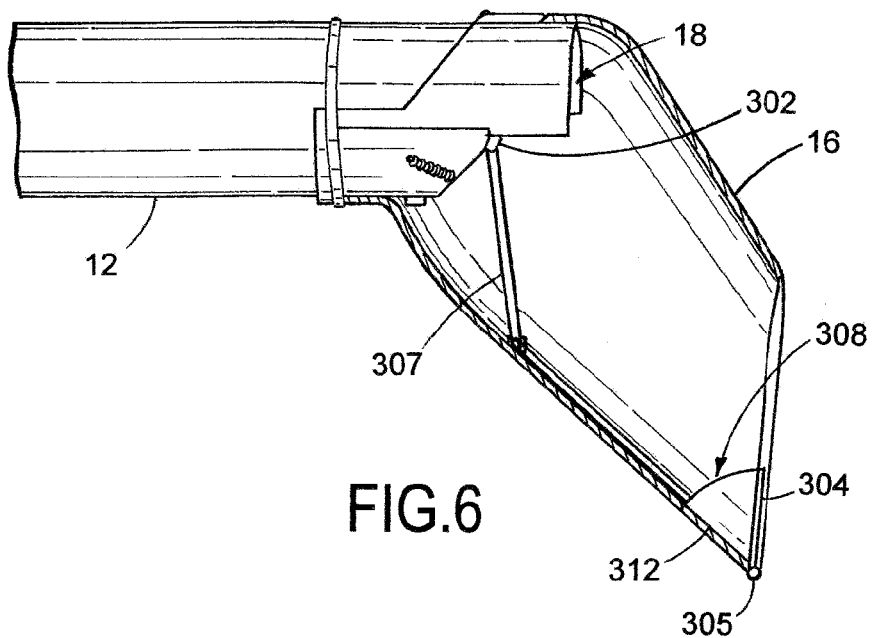
FIG. 6 illustrates a partial perspective view of a grain saver catch in accordance with another preferred embodiment of the present invention with a spout shown in cross-section.
Figure 7:
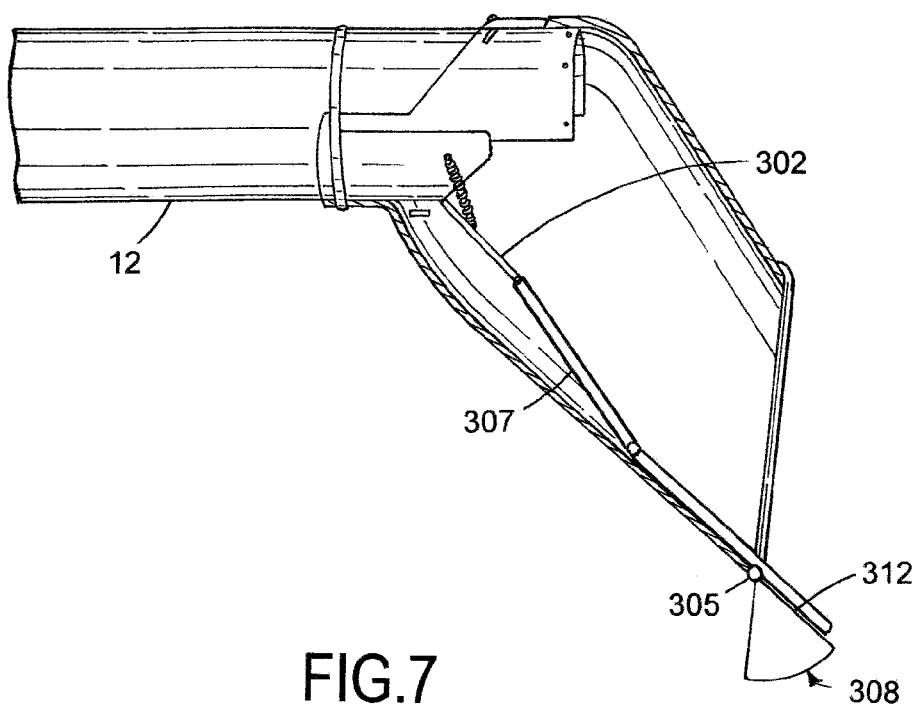
FIG. 7 illustrates a partial perspective view of the grain saver catch of FIG. 6 in a second or discharge position.

Referring now to FIGS. 6 and 7, in accordance with a third preferred embodiment, the present invention includes a catch 304 configured to be completely separate and spaced apart from the door 302. In this embodiment, the catch 304 receives and retains grain dribble discharged from the discharge outlet 18 of unloader tube 12 at a position downstream of the discharge outlet 18, e.g., at a position within the spout 16 or at the end of the spout 16.

Figure 8:
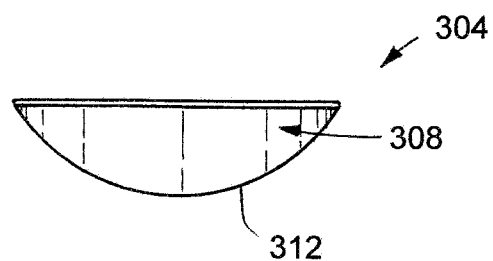
FIG. 8 illustrates a top plan view of the grain saver catch of the embodiment of FIG. 6.

The catch 304 is preferably mounted to or within the spout 16 at a position spaced from the discharge outlet 18 and door 302, as shown and configured in FIG. 6. Catch 304 can be located at any point within the spout 16 along its bottom inner surface, for instance, at a position adjacent the bottom end of the spout 16. Catch 304 is preferably pivotally connected to spout 16 via a pivot mechanism 305. The side wall 312 of the catch 304 is contoured to complement the concave curvature of the spout's inner surface 16. FIG. 8 provides a top plan view of the catch's open top end.

A linkage mechanism 307 is disposed and configured in connection with door 302 and mechanically links the catch 304 thereto so as to move in tandem with the door 302. That is, as the door 302 moves from the closed position to the open position, the catch 304 correspondingly moves from a first position (FIG. 6) to a second position (FIG. 7). In the first position the catch 304 is oriented so that its open end 308 is facing towards the discharge outlet 18 and its side wall 312 is adjacent an inner surface of the spout 16. In the second position the catch 304 is pivoted so that its open end 308 faces substantially downwardly so as to allow captured grain to dispense therefrom. In sum, the door 302 is configured to be mounted to the unloader tube 12 and the catch 304 is configured to be mounted adjacent to a discharge end of the spout 16 connected to the end of the unloader tube. The linkage 307 is operatively connected between the door 302 and the catch 304 and configured to move the catch 304 between first and second positions.

Figure 9:
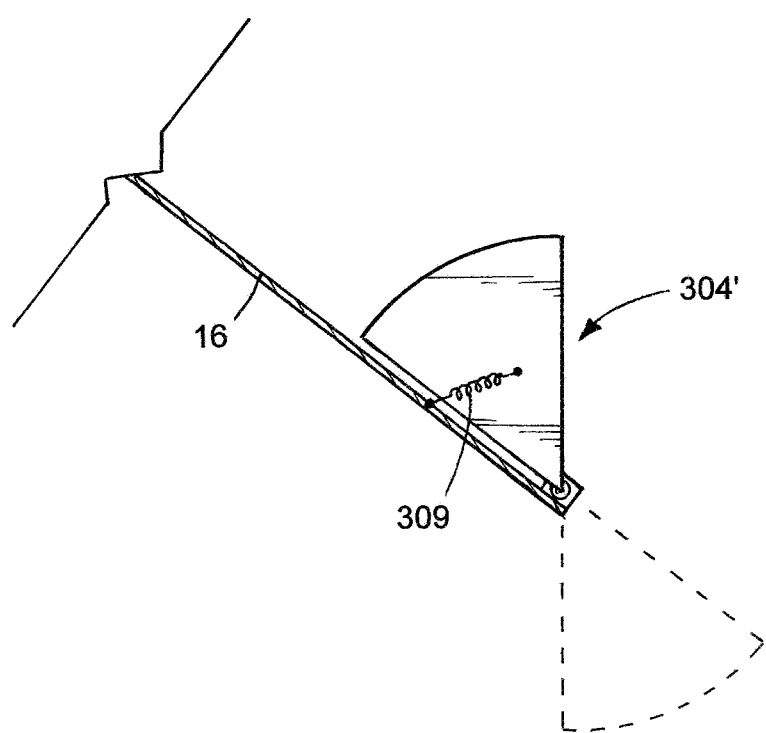
FIG. 9 illustrates a partial side view of an alternative embodiment of the grain saver catch of FIG. 6.

Referring to FIG. 9, instead of a linkage mechanism 307, a catch 304' can be configured with a biasing element 309, preferably configured as a compression spring, biasing the catch 304' to a first or catch position. However, upon receiving a force from flowing grain being discharged from the discharge outlet 18 during normal discharging operations, the catch 304' is moved to a second or discharge position (as shown in phantom in FIG. 9). That is, the biasing element 309 is configured to be yieldable to a force exerted thereagainst by catch 304' as a result of the force of discharging grain against the catch 304' to allow catch 304' to be movable from the first position to the second position. Then upon an absence of the force of flowing grain, the biasing element 309 biases the catch 304' back to the first or catch position.

Figure 10:
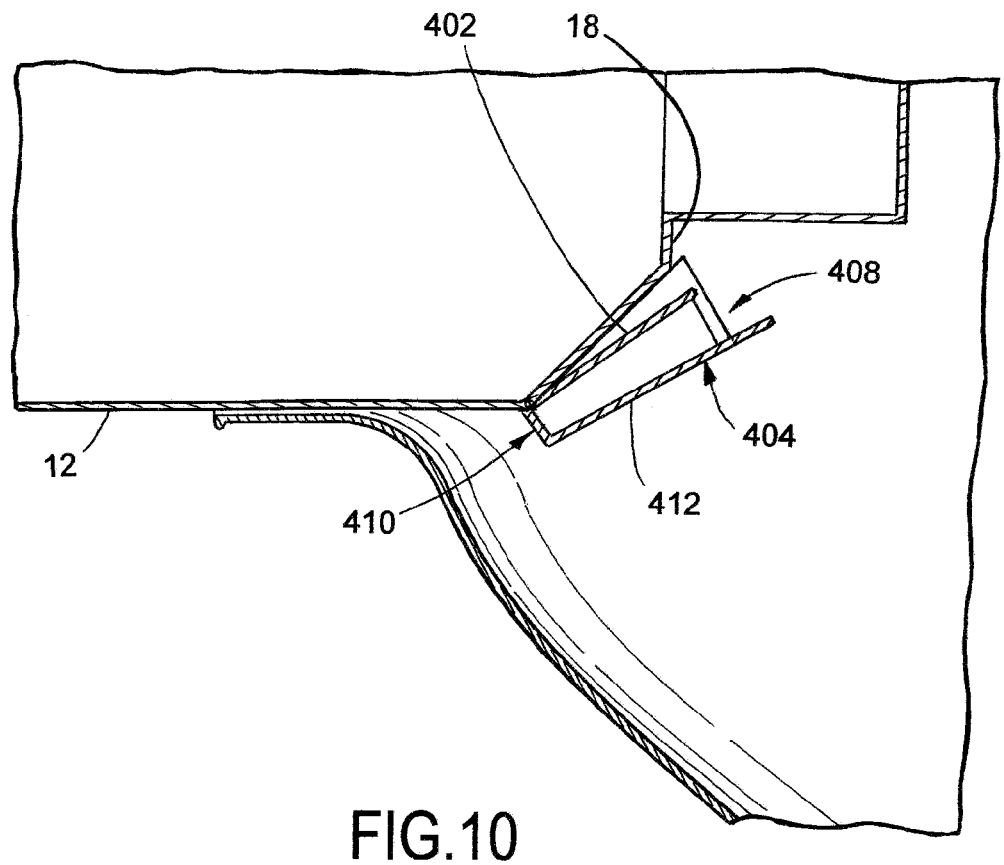
FIG. 10 illustrates a partial side cross-sectional view of a grain saver catch in accordance with a further preferred embodiment of the present invention.

Referring to FIG. 10, a fourth embodiment of the present invention is illustrated. In this embodiment, the present invention includes an unloader tube 12 and a catch 404 mounted adjacent a discharge outlet 18 of the unloader tube 12. Similar to the above embodiments, the unloader tube 12 includes an internal passage in fluid communication with the discharge outlet at an end of the unloader tube 12.

The catch 404 includes a receptacle having an open end 408 and a closed end 410 opposite the open end 408. The closed end 410 of the catch 404 is pivotally mounted to the unloader tube 12, preferably about a bottom end portion of the unloader tube's discharge outlet 18, via a pivot mechanism. The catch 404 can be configured substantially the same as catch 104 described above, but does not include the feature of a door, such as door 102. Instead, the catch 404 serves as an abutment to prevent the grain from inadvertently discharging from the unloader tube 12. That is, in the present embodiment, there is no separate grain dribble door. Here, the catch 404 serves a dual function of preventing the inadvertent discharge of grain from the unloader tube 12 and as a means to retain grain escaping from the unloader tube 12.

Further, similar to the catch 104 of the first embodiment, the catch 404 is moveable between a first position for a least partially covering the discharge outlet 18 and a second position located below a flow path of grain discharged through the discharge outlet 18 for releasing grain retained within the catch 404.

The catch 404 is further preferably configured to include a receptacle having at least a first side wall 412 and a second side wall 402 opposite the first side wall 412. The second side wall 402 at least partially covers the discharge outlet 18 and the first side wall 412 extends a distance further than the second side wall 402. Thus, the first side wall 412 also forms a flange-like extension or baffle 412a to direct or deflect the flow of grain escaping from the discharge outlet 18 to the open end 408.

Figure 11:
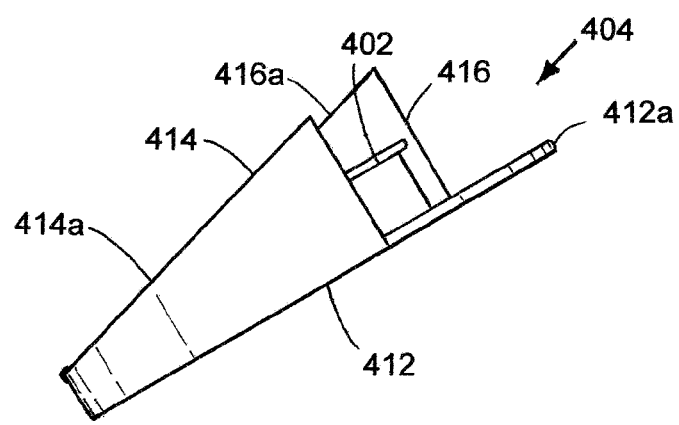
FIG. 11 illustrates a perspective view of the grain saver catch of FIG. 10.

Additionally, as shown in FIG. 11, the catch 404 is configured to include at least a third side wall 414 and a fourth side wall 416 opposite the third side wall 414. The third and fourth side walls 414, 416 each extend past the second side wall 402 to form flange-like extensions or baffles 414a, 416a. The flange-like extensions function to direct the flow of grain escaping from the discharge outlet 18 up to the top of the catch 404 and into the open end 408.

In sum, the present invention described in the above embodiments advantageously provides a means to prevent unwanted grain loss from the unloader tube. As a result, the present invention addresses a long standing unmet need in the field harvesting industry.

It will be appreciated by those skilled in the art that changes could be made to the embodiments described above without departing from the broad inventive concept thereof. It is to be understood, therefore, that this invention is not limited to the particular embodiments disclosed, but it is intended to cover modifications within the spirit and scope of the present invention as defined by the appended claims.

I claim:

1. An agricultural combine unloader assembly comprising:
an unloader tube having an internal passage in fluid communication with a discharge outlet at an end of the unloader tube;
a door mounted adjacent the discharge outlet for covering the discharge outlet, wherein the door is moveable between an open position uncovering the discharge outlet and a closed position at least partially covering the discharge outlet, and wherein in the open position, the door is positioned below a flow path of grain to be discharged through the discharge outlet; and
a catch mounted adjacent the door, the catch including a housing having an open end adjacent a first end of the door and a closed end adjacent a second end of the door opposite the first end, wherein the catch is operatively connected to the door and moveable between a first position and a second position.

2. The agricultural combine unloader assembly of claim 1, wherein when the door is moved to the closed position, the catch is moved to the first position and when the door is moved to the open position, the catch is moved to the second position.

3. The agricultural combine unloader assembly of claim 1, wherein the housing is moveable between first and second positions relative to the door.

4. The agricultural combine unloader assembly of claim 1, wherein the housing further comprises a wall forming the open end and an extension extending from a portion of the wall.

5. The agricultural combine unloader assembly of claim 4, wherein the extension extends substantially parallel to the door and beyond the first end of the door.

6. The agricultural combine unloader assembly of claim 4, wherein the extension extends at an angle relative to a longitudinal axis of the door and beyond the first end of the door.

7. The agricultural combine unloader assembly of claim 4, wherein the extension is a flange, a baffle, a concave extension, a convex extension, or a screen.

8. The agricultural combine unloader assembly of claim 1, wherein the housing includes a lateral wall.

9. The agricultural combine unloader assembly of claim 1, wherein the housing includes a lateral wall engaging the door and a lateral wall extension extending beyond a lateral wall and door interface.

10. The agricultural combine unloader assembly of claim 1, wherein the housing includes a first wall, a second wall connected to the first wall and a third wall connected to the first wall, and wherein the second and third walls are connected with the door forming an enclosure.

11. The agricultural combine unloader assembly of claim 1, wherein a longitudinal cross-section of the open end is larger than a longitudinal cross-section of the closed end.

12. The agricultural combine unloader assembly of claim 1, wherein the catch is pivotally connected to the unloader tube.

13. The agricultural combine unloader assembly of claim 1, wherein the door is pivotally connected to the unloader tube.

14. The agricultural combine unloader assembly of claim 13, wherein catch is pivotally connected to the door.

15. The agricultural combine unloader assembly of claim 1, further comprising a spout connected to the end of the unloader tube, wherein the catch is positioned within the spout for collecting grain exiting the discharge outlet.

16. The agricultural combine unloader assembly of claim 15, wherein the catch includes a linkage connected to the door, wherein the linkage is configured to move the catch from a first position to a second position for unloading grain collected in the catch.

17. A door assembly for an agricultural combine unloader comprising:
a door sized and shaped for covering a discharge outlet of an unloader tube, wherein the door is mounted to the unloader tube and moves between a first position for at least partially covering the discharge outlet and a second position spaced from the first position; and
a catch operatively connected to the door for receiving grain from the discharge outlet wherein the catch includes a receptacle formed by the door for receiving the flow of grain.

18. The door assembly of claim 17, wherein the catch is connected adjacent to the door.

19. The door assembly of claim 17, wherein the door is configured to be mounted to the unloader tube and the catch is configured to be mounted adjacent to a discharge end of a spout connected to the end of the unloader tube, the door assembly further comprising a linkage operatively connected between the door and the catch.

20. The door assembly of claim 17, wherein the catch includes at least one wall forming an enclosure in cooperation with the door.

21. A door assembly for an agricultural combine unloader comprising:
   a door sized and shaped for covering a discharge outlet of an unloader tube, wherein the door is mounted to the unloader tube and moves between a first position for at least partially covering the discharge outlet and a second position spaced from the first position; and
   a catch operatively connected to the door for receiving grain from the discharge outlet wherein the catch includes walls cooperatively engaging the door forming a container having an open end and a closed end.

22. The door assembly of claim 21, wherein the open end is adjacent a first end of the door and the closed end is adjacent a second end of the door opposite the first end.

23. The door assembly of claim 22, wherein the catch further includes an extension extending from a portion of the walls and beyond the first end of the door.

24. An agricultural combine unloader assembly comprising:
   an unloader tube having an internal passage in fluid communication with a discharge outlet at an end of the unloader tube; and
   a catch mounted adjacent the discharge outlet, the catch including a receptacle having an open end and a closed end opposite the open end,
   wherein the catch is moveable between a first position for at least partially covering the discharge outlet and a second position located below a flow path of grain discharged through the discharge outlet for releasing grain retained within the catch.

25. The agricultural combine unloader assembly of claim 24, wherein the receptacle further comprises at least a first side wall and a second side wall opposite the first side wall, and wherein the second side wall at least partially covers the discharge outlet and the first side wall extends a distance further than the second side wall.

26. The agricultural combine unloader assembly of claim 25, wherein the receptacle further includes at least a third side wall and a fourth side wall opposite the third side wall, and wherein the third and fourth side walls extend past the second side wall.

* * * * *